United States Patent
Chang et al.

(10) Patent No.: US 9,363,503 B2
(45) Date of Patent: Jun. 7, 2016

(54) IMAGE ACCESS METHOD AND IMAGE ACCESS APPARATUS

(71) Applicant: MStar Semiconductor, Inc., Hsinchu Hsien (TW)

(72) Inventors: Chih-Hao Chang, Hsinchu Hsien (TW); Huan-Chun Tseng, Zhubei (TW); Cheng-Yu Hsieh, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 164 days.

(21) Appl. No.: 14/173,000

(22) Filed: Feb. 5, 2014

(65) Prior Publication Data
US 2014/0218381 A1    Aug. 7, 2014

(30) Foreign Application Priority Data
Feb. 7, 2013 (TW) ............... 102104824 A

(51) Int. Cl.
*H04N 13/04* (2006.01)
*H04N 13/00* (2006.01)

(52) U.S. Cl.
CPC ....... *H04N 13/0402* (2013.01); *H04N 13/0029* (2013.01); *H04N 13/0066* (2013.01)

(58) Field of Classification Search
None
See application file for complete search history.

(56) References Cited

U.S. PATENT DOCUMENTS 5,351,067 A * 9/1994 Lumelsky ............ G09G 5/14
                                                345/519
8,160,394 B2 * 4/2012 Acree .................. G06T 3/0018
                                                382/293

FOREIGN PATENT DOCUMENTS

JP        2006115246 A      4/2006

OTHER PUBLICATIONS

Taiwan Office Action, Aug. 13, 2015, 7 pages.

* cited by examiner

*Primary Examiner* — Maurice L McDowell, Jr.
(74) *Attorney, Agent, or Firm* — Edell, Shapiro & Finnan, LLC

(57) ABSTRACT

An image access method applicable to an image access device is provided. The method includes: providing a plurality of codes that respectively represent a plurality of image sources; determining a plurality of sets of access settings according to a pixel format arrangement, each set of access setting corresponding to a code arrangement combination composed of the codes; and sequentially accessing data of the image sources by the image access apparatus according to the code arrangement combinations corresponding to the access settings.

12 Claims, 10 Drawing Sheets

IMAGE ACCESS METHOD AND IMAGE ACCESS APPARATUS

This application claims the benefit of Taiwan application Serial No. 102104824, filed Feb. 7, 2013, the subject matter of which is incorporated herein by reference.

BACKGROUND OF THE INVENTION

1. Field of the Invention

The invention relates in general to an image access method and an image access apparatus, and more particularly, to an image access method and an image access apparatus of three-dimensional (3D) display technologies.

2. Description of the Related Art

In the recent years, three-dimensional (3D) display technologies are developed at an overwhelming speed and are widely applied in various devices, e.g., projectors, televisions, display devices and panels of mobile devices. Referring to FIG. 1, a fundamental 3D image display architecture 100 usually includes a plurality of image sources 112 and 114, a processor 120, and a display device 130. The image sources 112 and 114 respectively represent images observed at different viewing angles. For example, in FIG. 1, the image source 112 may represent an image that is suitably viewable by the left eye, and the image source 114 may represent an image that is suitably viewable by the right eye. According to a predetermined pixel format arrangement, the 3D image display architecture 100 accesses images from the image sources 112 and 114 by the processor 120, and processes the accessed images and outputs the processed images, or directly outputs the accessed images, to the display device 130 that then displays a 3D image. However, as the display device 130 supports predetermined pixel format arrangements to thus present predetermined 3D image effects, the display device 130 can only correctly display the 3D image given that the predetermined format arrangement processed by the processor 120 and the predetermined pixel format arrangement supported by the display device 130 are consistent.

Current pixel format arrangements for 3D image display are not standardized, and so many different pixel format arrangements are available in the application of the 3D display technologies. For example, referring to FIG. 2, a pixel format arrangement may be utilizing pixels of the image sources 112 and 114 in turn in a unit of pixels, with each of the pixels including R, G and B sub-pixels. In other words, an output image 200 outputted to the display device in turn presents the pixels of the image sources 112 and 114 in a unit of pixels. Referring to an output image 300 in FIG. 3, a pixel format arrangement may also be in turn presenting the sub-pixels of the image sources 112 and 114 in a unit of sub-pixels. Referring to an output image 400 in FIG. 4, compared to the non-quincunx pixel format arrangement in FIG. 2, the pixel format arrangement in FIG. 4 is a quincunx arrangement. A main difference between a non-quincunx arrangement and a quincunx arrangement is that, the quincunx arrangement, instead of consistently utilizing a pixel of the image source 112, in turn utilizes a pixel of the image source 112 and a pixel of the image source 114 as a starting pixel of each horizontal scan line. Referring to an output image 500 in FIG. 5, compared to the pixel format arrangement in FIG. 3 in a unit of sub-pixels, the arrangement in FIG. 5, according to a presentation sequence of horizontally shifting in a unit of sub-pixels along with a vertical coordinate of a horizontal scan line, presents sub-pixels from the other image source after every other three sub-pixels (not necessarily of the same pixel). Referring to an output image 600 in FIG. 6, to prevent a dead zone in current 3D image display, many 3D image display devices employ slanted lenticular lens technologies that access data in a unit of sub-pixels from images (e.g., images sources a to g) captured from different viewing angles. As such, the pixel format arrangement may become even more complicated.

Base on the above, in order to support various pixel format arrangements, current techniques provide a solution for different pixel arrangements through different software/hardware designs. That is, an exclusive software/hardware design is provided for each of the pixel format arrangements. However, such approach not only increases design costs but also offers limited flexibilities. Therefore, there is a need for a flexible software/hardware processing architecture that coordinates with a pixel format arrangement supported by a rear-end display device to appropriately access data from multiple image sources, thereby at the same time achieving objects of compatibility as well as reduced costs and enhanced flexibilities.

SUMMARY OF THE INVENTION

According to an embodiment of the present invention, an image access method for an image access apparatus is provided. The method includes: providing a plurality of codes that respectively represent a plurality of image sources; determining a plurality of sets of access settings according to a pixel format arrangement, each set of access setting corresponding to a code arrangement combination composed of the codes; and accessing data of the image sources sequentially according to the code arrangement combinations corresponding to the access settings.

According to another embodiment of the present invention, an image access method for an image access apparatus is provided. The method includes: reading K sets of access settings, wherein K is a positive integer, each set of access settings corresponds to a code arrangement combination composed of a plurality of codes respectively representing a plurality of image sources; and accessing data of the image sources represented by the codes sequentially according to the K sets of code arrangement combinations.

According to another embodiment of the present invention, an image access apparatus for accessing data of a plurality of image sources is provided. The image access apparatus includes: a memory unit, configured to store K sets of access settings, wherein each set of the K sets of access settings corresponds to a code arrangement combination composed of a plurality of codes respectively representing a plurality of image sources; a parser, configured to read the K sets of access settings and to output the K sets of code arrangement combinations corresponding to the K sets of access settings; and a loader, configured to receive the K sets of code arrangement combinations corresponding to the K sets of access settings, and to sequentially access the data of the image sources represented by the codes.

The above and other aspects of the invention will become better understood with regard to the following detailed description of the preferred but non-limiting embodiments. The following description is made with reference to the accompanying drawings.

DETAILED DESCRIPTION OF THE INVENTION

Technical terms of the application are based on general definition in the technical field of the application. If the application describes or explains one or some terms, definition of the terms are based on the description or explanation of the application. In possible implementation, in the application, the relationship between objects or events includes a direct relationship or an indirect relationship. The indirect relationship refers to that there are intermediate objects or space between the objects or there are intermediate events or timing periods between the events. Further, shapes, sizes and ratios of the objects are exemplary for one skilled person in the art to understand the application, not to limit the application.

Each of the disclosed embodiments has one or more technical features. However, it does not mean that implementation of the application needs every technical feature of any embodiment of the application or combination of the embodiments of the application is prohibited. In other words, in possible implementation, one skilled person in the art would selectively implement part or all technical features of any embodiment of the application or selectively combine part or all technical features of the embodiments of the application based on the disclosure of the application and his/her own need. Implementation of the application is flexible.

The disclosure of the application includes an image access method and an image access apparatus. The method and apparatus may coordinate with a pixel format arrangement supported by a display apparatus to appropriately access data from multiple image sources, thereby achieving universal and effective image access. The method and apparatus of the present invention are applicable to various 3D image display devices, such as projectors, televisions, display devices, and panels of mobile devices (e.g., cell phones or tablet computers). In possible implementation, one skilled person in the art may choose equivalent elements or steps to implement the disclosure based on the disclosure of the application. That is, the implementation of the disclosure is not limited by the embodiments disclosed in the disclosure. Besides, the image access method of the present invention may be performed by the image access apparatus of the present invention or other image access apparatuses. Without affecting the full disclosure and possible implementation of the methods of the application, steps of the method instead of hardware devices are described in detail. Similarly, part or all components of the image access apparatus are individually known elements. Therefore, without affecting the full disclosure and possible implementation of the apparatus, details of known individual components are omitted herein.

Figure 7:
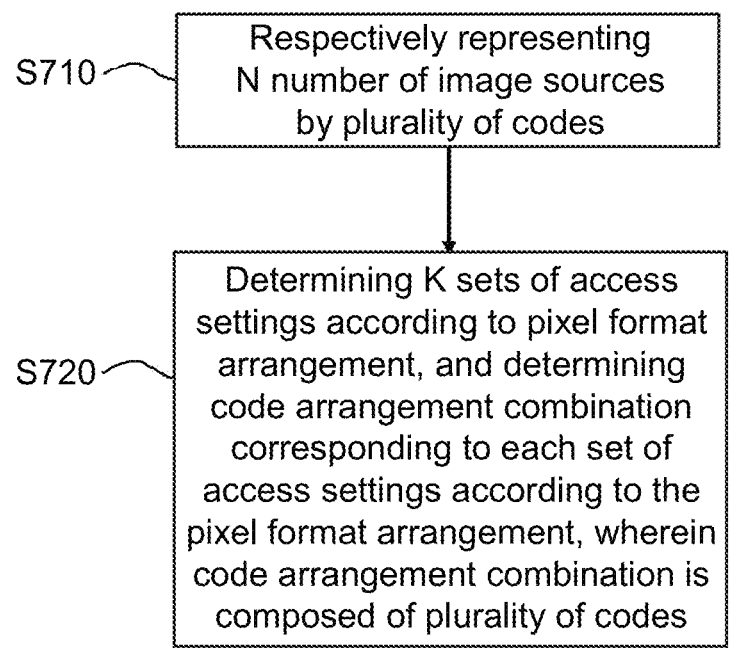
FIG. 7 is a flowchart of an image access method according to an embodiment of the present invention.

FIG. 7 shows a flowchart of an image access method according to an embodiment of the present invention. The embodiment may be realized by firmware. The firmware refers to software stored in a memory (e.g., a non-volatile memory) and executable by an image access apparatus, so as to allow the apparatus to determine how data from a plurality of image sources is to be accessed. The method according to the embodiment includes the following steps.

In step S710, a plurality of codes are provided to represent an N number image sources, respectively. Each of the codes includes an M number of A carry bits, where A to the power of M is not smaller than N, and N, M and A are all positive integers. For example, referring to FIG. 8, assume that image sources include an image source 812 and an image source 814 (i.e., the number of image sources is N=2). In step S710, a code "0" is utilized to represent the image source 812, and a code "1" is utilized to represent the image source 814. Each of the codes is a binary bit (i.e., the bit count of each code is M=1, and is in a binary form (A=2)), and the foregoing relationship of A, M and N is established.

In step S720, K sets of access settings are determined according to a pixel format arrangement, and a code arrangement combination corresponding to each set of access settings is determined according to the pixel format arrangement, where K is a positive integer. Each code arrangement combination is composed of the codes.

The K sets of access settings are read by the image access apparatus. The image access apparatus sequentially accesses data of the image source represented by each of the codes in the code arrangement combination according to the code arrangement combination corresponding to each set of access settings, and different sets of access settings correspond to different horizontal scan lines. Alternatively speaking, each set of access setting is associated with a pixel arrangement of a corresponding row (a scan line) of an image). For example, referring to FIG. 8, assume the pixel format arrangement requires that, in a unit of sub-pixels (i.e., units of R, G and B primary colors in pixels), the sub-pixels of the image source 812 and the image source 814 are to be in turn outputted as a horizontal coordinate of each horizontal scan line increases, and requires a starting sub-pixel of each horizontal scan line to alternately adopt the sub-pixels of the image source 812 and the image source 814 as a vertical coordinate of each horizontal scan line increases. Accordingly, in step S720, two sets of access settings Set1 and Set2 (as shown in Table-1) are determined according to the pixel format arrangement. More specifically, for Set1, the code "0" and the code "1" are utilized to indicate the code arrangement combination 0_1_0_1_0_1 (corresponding to a sequence as R0, G1, B0, R1, G0, B1 and such repetitions, where R0 represents the red sub-pixel of the image source 812, G1 represents the green sub-pixel of the image source 814, and so forth). Further, for Set2, the code arrangement combination 1_0_1_0_1_0 (corresponding to a sequence as R1, G0, B1, R0, G1, B0, and such repetitions, where R1 represents the red sub-pixel of the image source 814, G0 represents the green sub-pixel of the image source 812, and so forth). By accessing data along the horizontal direction repetitively according to Set1 or Set2 and by accessing data along the vertical direction alternately according to Set1 and Set2, the pixel format arrangement of the output image 820 in FIG. 8 can be satisfied. In other words, an image access apparatus may access data of an image source represented by each code in a code arrangement combination of each set of access settings according to one or multiple combinations of access settings, and output processed accessed image or directly output the accessed image to a rear-end display device.

TABLE 1

Figure 8:
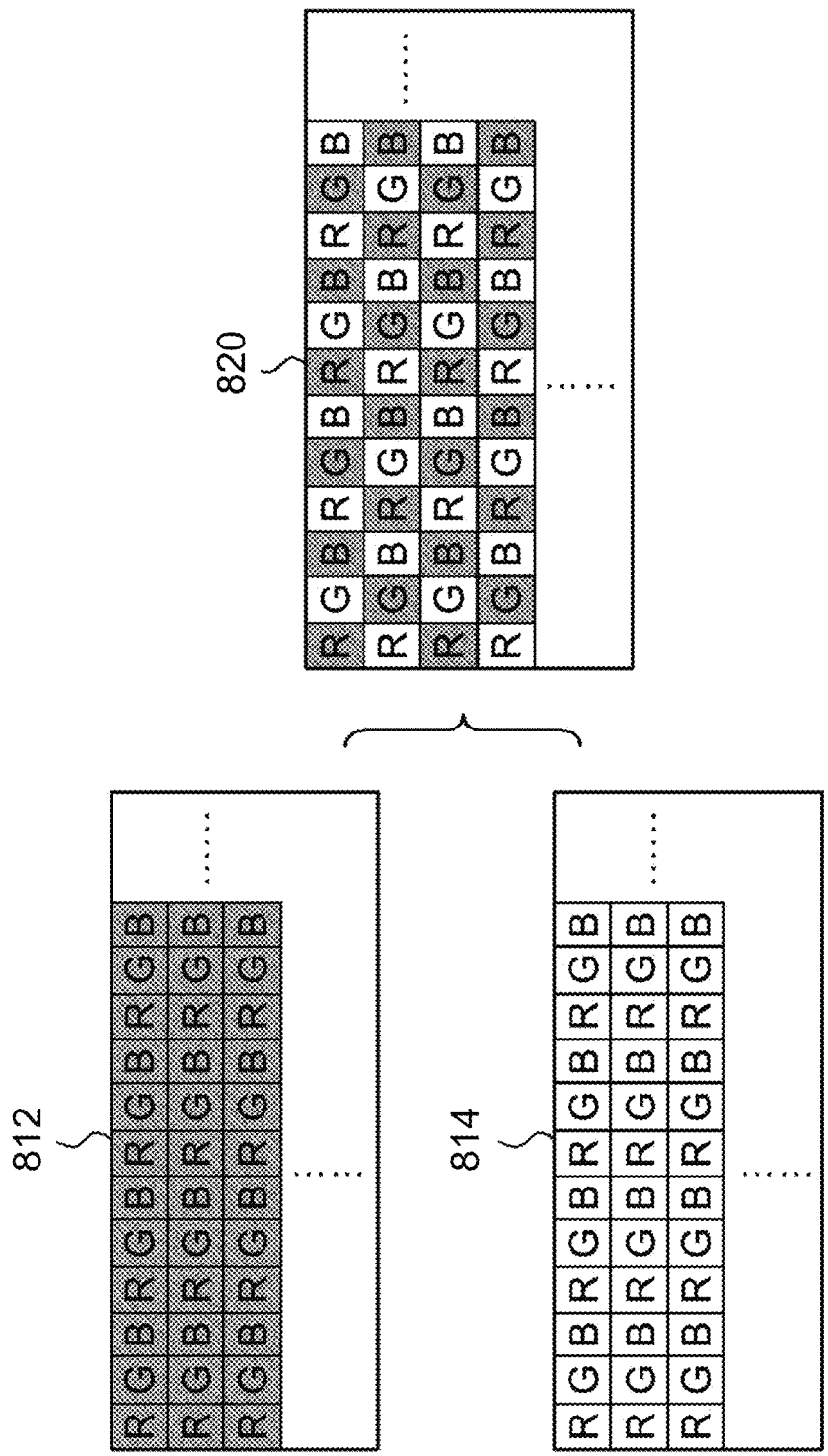
FIG. 8 is a schematic diagram of a pixel format arrangement.

(corresponding to FIG. 8)

| Access setting | Code arrangement combination (code "0": image source 812; code "1": image source 814) |
|---|---|
| Set1 | 0_1_0_1_0_1 |
| Set2 | 1_0_1_0_1_0 |

In the embodiment, the number of the codes is equal to the number N of the image sources, and the codes are different for respectively representing different image sources. Further, the K sets of code arrangement combinations are different. Since the same code arrangement combination is included in the same set of access settings, the K sets of code arrangement combinations need not be repeated. Moreover, the pixel format arrangement is predetermined. More specifically, the pixel format arrangement is determined in advance according to requirements or support capabilities of a rear-end display device. However, in an alternative embodiment of the present invention, the pixel format arrangement may also be determined after the type of the rear-end display device is actively detected, e.g., one from a plurality of built-in pixel arrangement formats is selected according to a result of the active detection. It should be noted that, details of the number of codes, whether the codes are different, whether the code arrangement combinations are different, and the methods for determining the pixel format arrangement are example for one skilled person in the art to understand the present invention. Without affecting possible implementation of the present invention, the exemplary details are not to be construed as limitations to the embodiments. In summary, in the embodiment, one or multiple sets of access setting are determined according to the periodical and repetitive rule along the vertical direction of the pixel format arrangement, and a code arrangement combination of the one or multiple sets of access settings is determined according to the periodical and repetitive rule along the horizontal direction. As such, regardless of the pixel format arrangement, the image access method of the present invention is capable of performing the settings with the same steps, so that an image access apparatus is enabled to read and parse a setting result of the setting method according to the same setting rules to appropriately output an image.

Based on the image access setting method in FIG. 7 and the embodiment in FIG. 8, one skilled person in the art may easily deduce the access settings and the code arrangement combinations of FIGS. 2 to 6, as shown by Table-2 to Table-6, respectively, thereby allowing an image access apparatus to access an image according to required access settings and code arrangement combination. Details previously described are sufficient for one skilled person in the art to deduce these settings and the corresponding code arrangement combinations, and an associated deduction process shall be omitted herein.

TABLE 2

Figure 1:
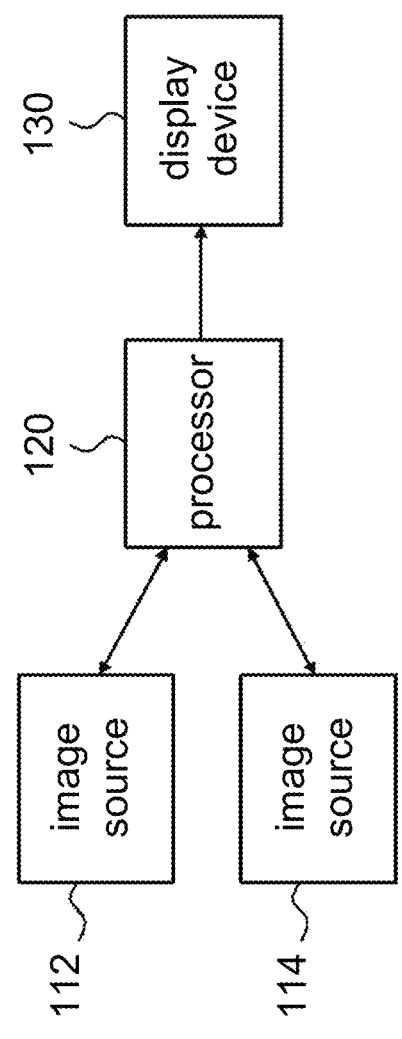
FIG. 1 is a schematic diagram of a 3D image display architecture.
Figure 2:
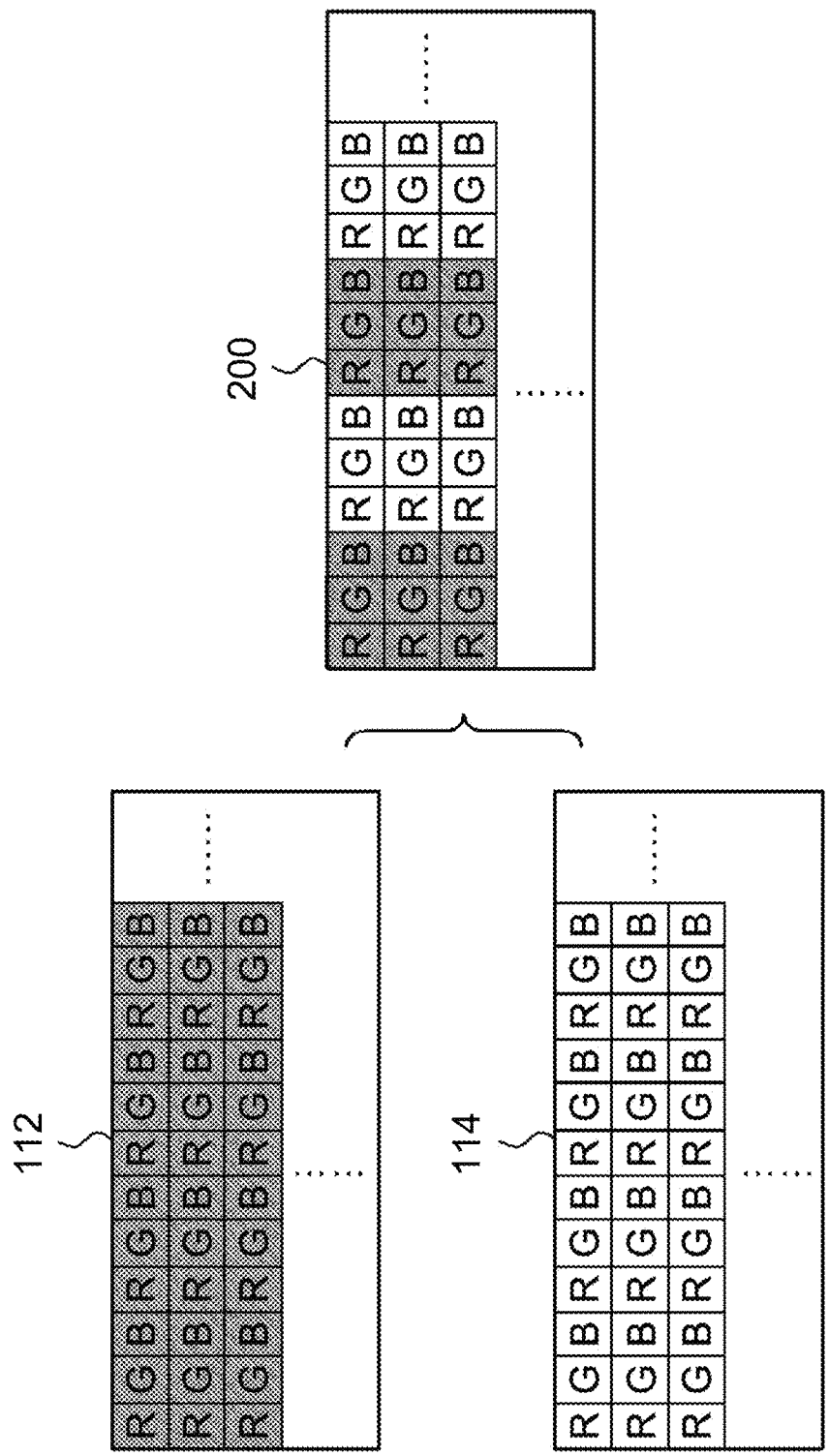
FIG. 2 is a schematic diagram of a pixel format arrangement.

(corresponding to FIG. 2)

| Access setting | Code arrangement combination (code "0": image source 112; code "1": image source 114) |
|---|---|
| Set1 | 0_0_0_1_1_1 |

TABLE 3

Figure 3:
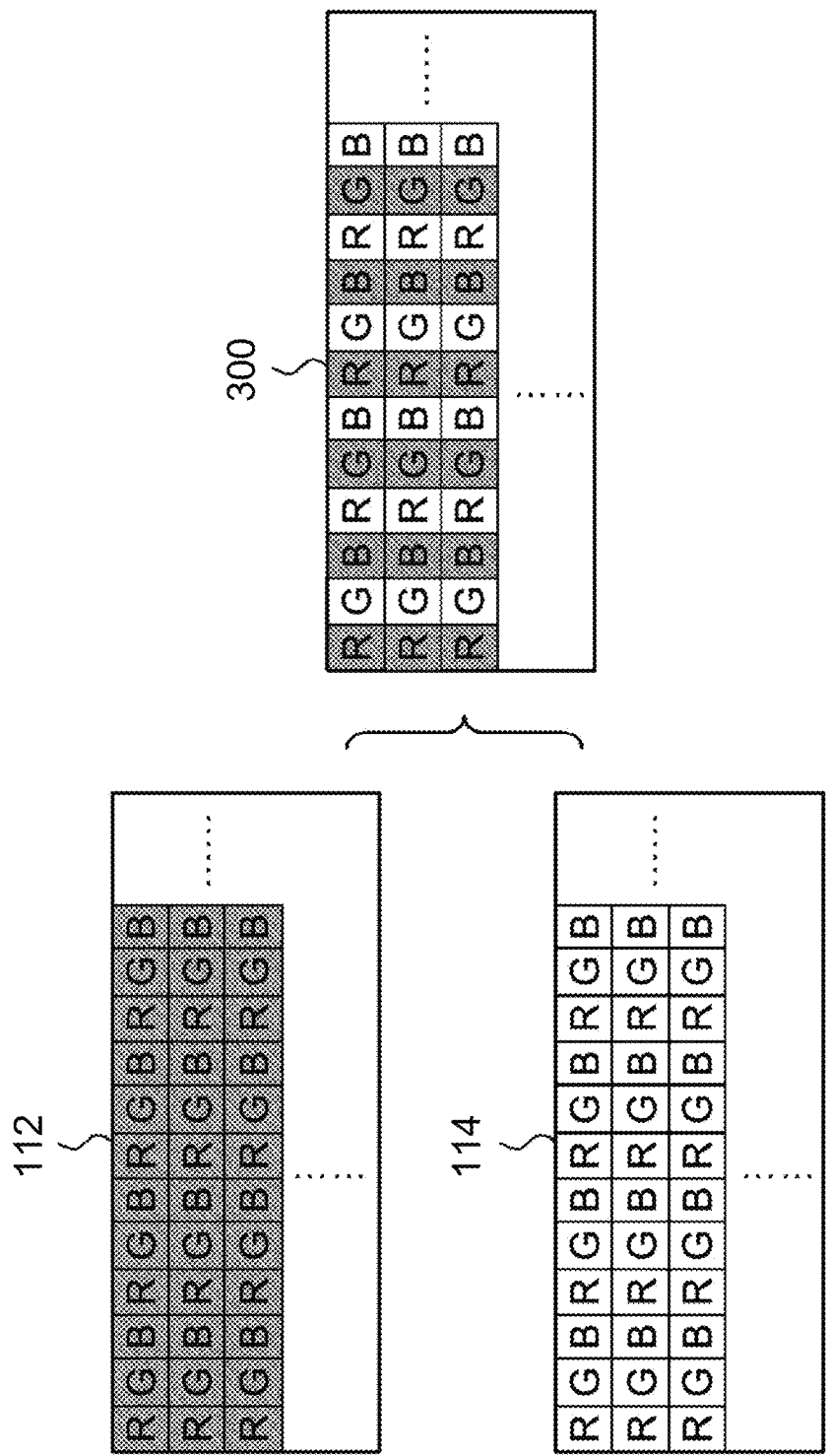
FIG. 3 is a schematic diagram of another pixel format arrangement.

(corresponding to FIG. 3)

| Access setting | Code arrangement combination (code "0": image source 112; code "1": image source 114) |
|---|---|
| Set1 | 0_1_0_1_0_1 (or simply 0_1) |

TABLE 4

Figure 4:
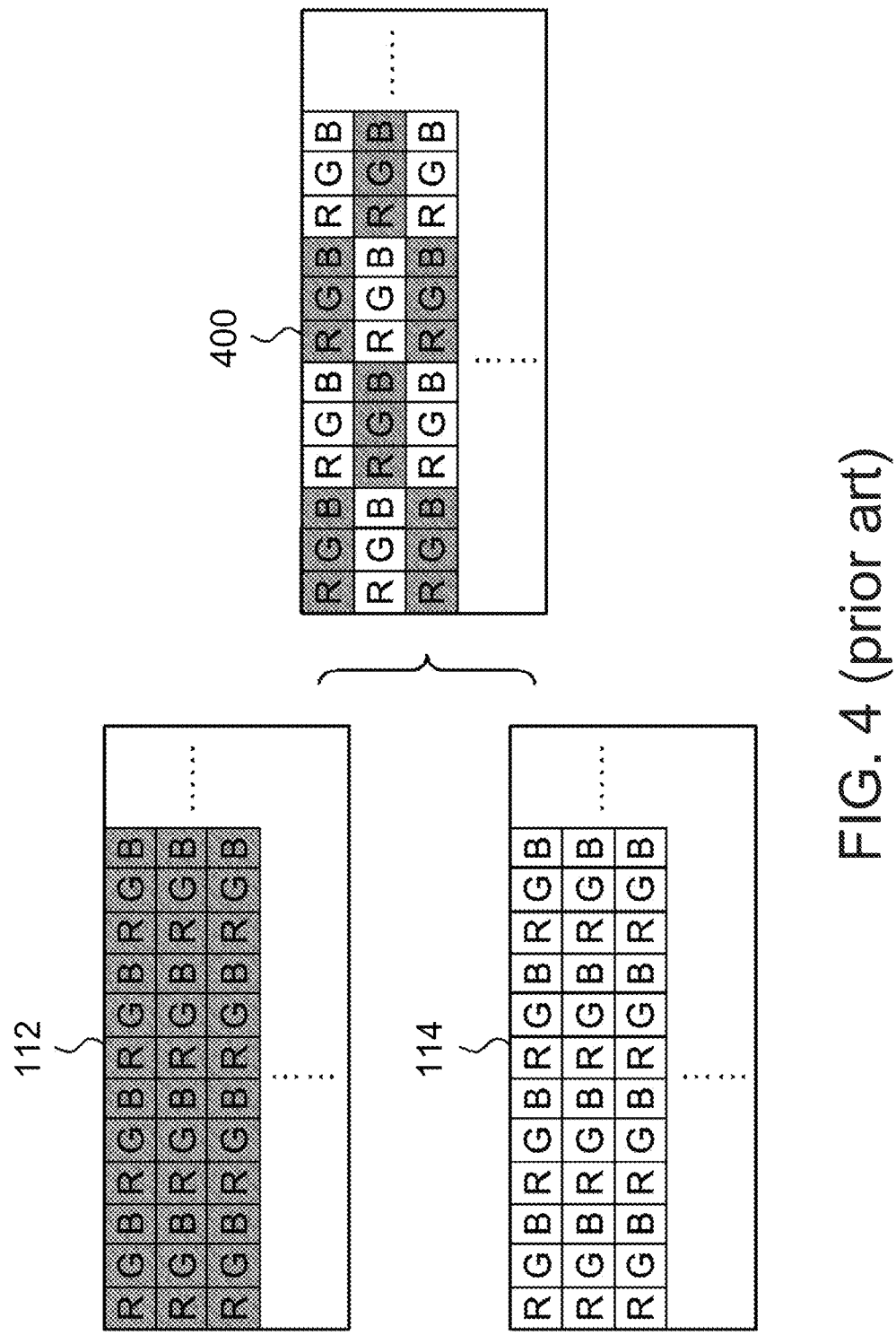
FIG. 4 is a schematic diagram of another pixel format arrangement.

(corresponding to FIG. 4)

| Access setting | Code arrangement combination (code "0": image source 112; code "1": image source 114) |
|---|---|
| Set1 | 0_0_0_1_1_1 |
| Set2 | 1_1_1_0_0_0 |

TABLE 5

Figure 5:
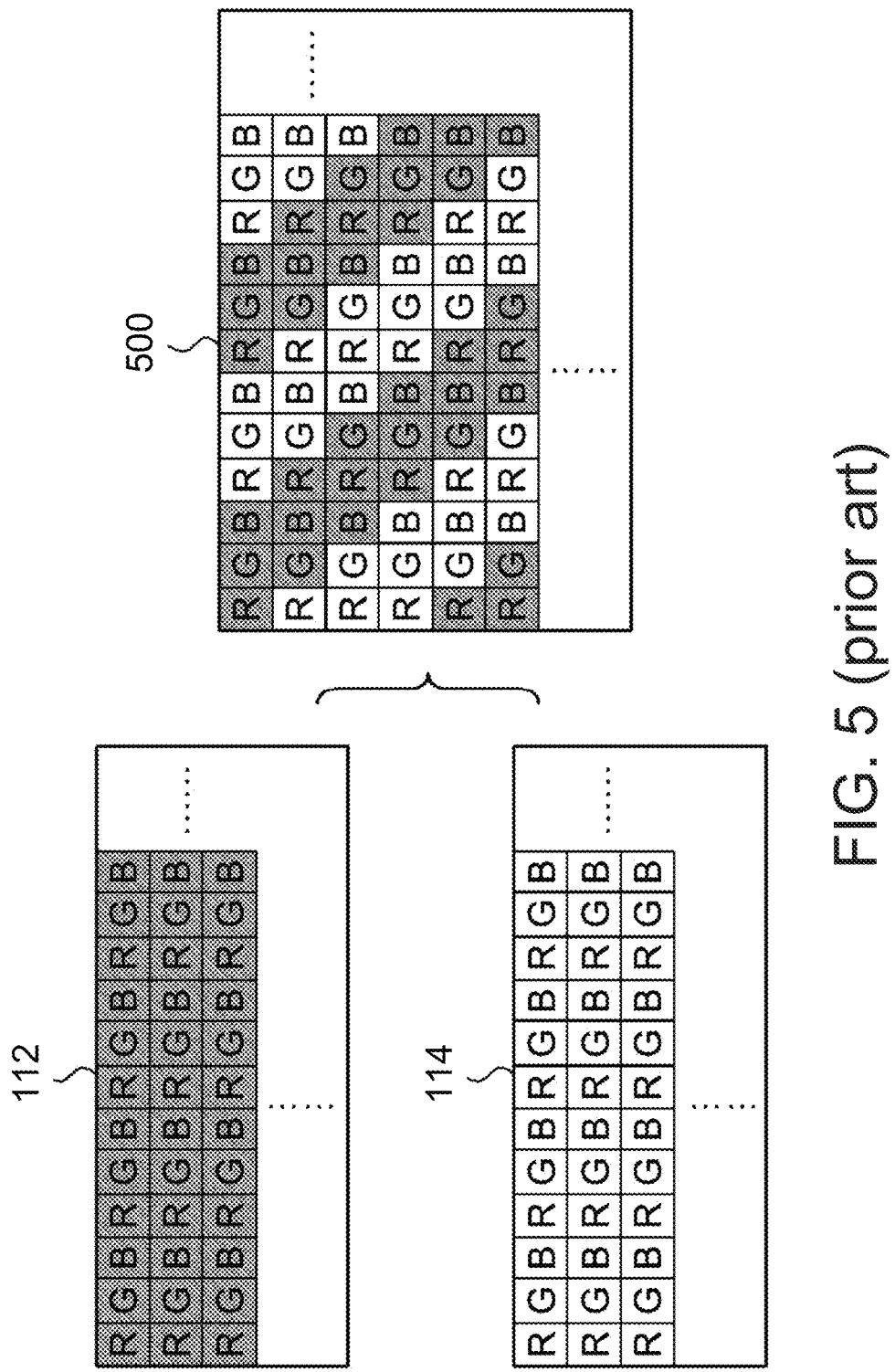
FIG. 5 is a schematic diagram of another pixel format arrangement.

(corresponding to FIG. 5)

| Access setting | Code arrangement combination (code "0": image source 112; code "1": image source 114) |
|---|---|
| Set1 | 0_0_0_1_1_1 |
| Set2 | 1_0_0_0_1_1 |
| Set3 | 1_1_0_0_0_1 |
| Set4 | 1_1_1_0_0_0 |
| Set5 | 0_1_1_1_0_0 |
| Set6 | 0_0_1_1_1_0 |

TABLE 6

Figure 6:
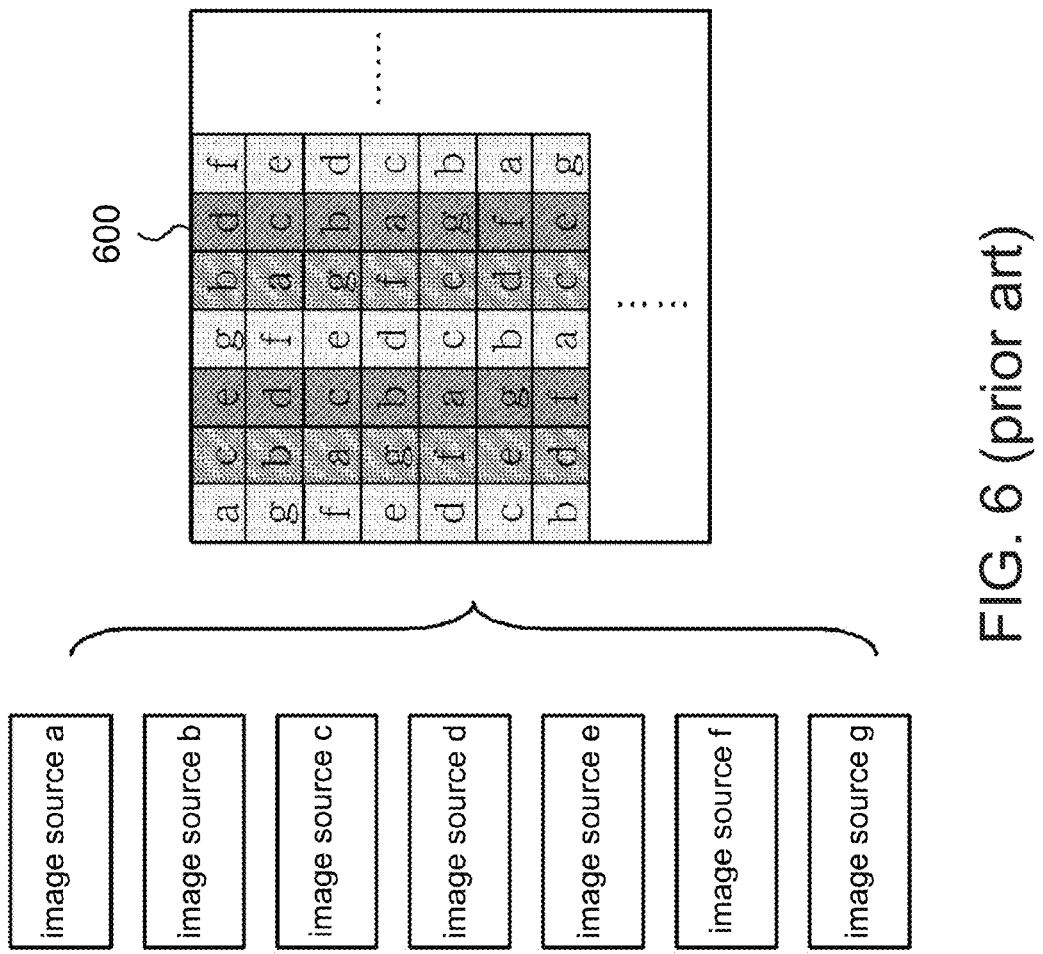
FIG. 6 is a schematic diagram of a pixel format arrangement based on slanted lenticular technologies.

(corresponding to FIG. 6)

| Access setting | Code arrangement combination (code "001": image source a; code "010": image source b; code "011": image source c; code "100": image source d; code "101": image source e; code "110": image source f; code "111": image source g) (each code in this table includes three binary bits) |
|---|---|
| Set1 | 001_011_101_111_010_100_110 (i.e., image sources a, c, e, g, b, d, f) |
| Set2 | 111_010_100_110_001_011_101 (i.e., image sources g, b, d, f, a, c, e) |
| Set3 | 110_001_011_101_111_010_100 (i.e., image sources f, a, c, e, g, b, d) |
| Set4 | 101_111_010_100_110_001_011 (i.e., image sources e, g, b, d, f, a, c) |
| Set5 | 100_110_001_011_101_111_010 (i.e., image sources d, f, a, c, e, g, b) |
| Set6 | 011_101_111_010_100_110_001 (i.e., image sources c, e, g, b, d, f, a) |
| Set7 | 010_100_110_001_011_101_111 (i.e., image sources b, d, f, a, c, e, g) |

Figure 9:
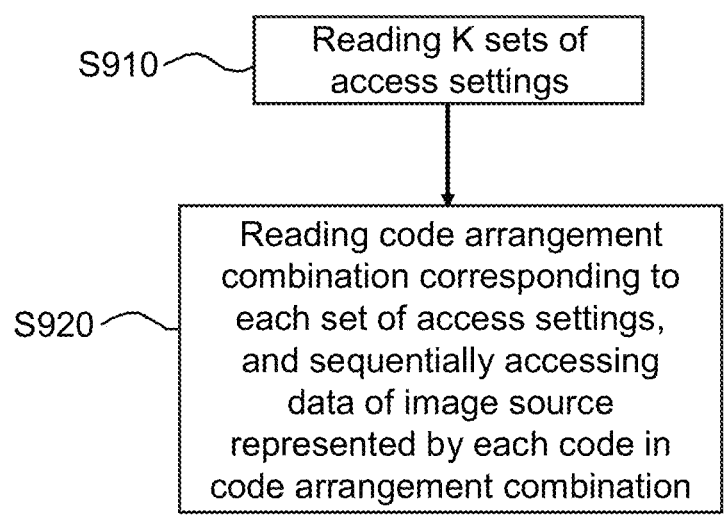
FIG. 9 is a flowchart of an image access method according to another embodiment of the present invention.

With reference to FIG. 9, details of a method for accessing a part or all of the data of an N number of image sources through the foregoing image access method and applying the method to an image access apparatus are given below. According to an embodiment, the method includes the following steps.

In step S910, K sets of access settings are read. Each set of the K sets of access settings corresponds to a code arrangement combination composed of a plurality of codes, which represent the N number of image sources, respectively. Each of the codes includes an M number of A carry bits, where A to the power of M is not smaller than N, and N, K, M and A are positive integers. For example, referring to FIG. 8 and Table- 1, according to the pixel format arrangement of the output image 820 in FIG. 8, step S910 correspondingly reads the two sets of access settings Set1 and Set2 shown in Table-1. Set1 corresponds to the code arrangement combination 0_1_0_1_0_1, and Set2 corresponds to the code arrangement combination 1_0_1_0_1_0. Each code arrangement combination is composed of the code "0" and the code "1", which represent the image source 812 and the image source 814, respectively. Further, each of the codes includes one binary bit.

In step S920, the code arrangement combination of each set of access settings is accessed, and the data of the image source represented by the each of the codes in the code arrangement combination is sequentially accessed. For example, referring to FIG. 8 and Table-1, to access the data of the image sources 812 and 814 to form a $V^{th}$ horizontal scan line (where V is a positive integer), step S920 reads the code arrangement combination 0_1_0_1_0_1 of Set1, and sequentially accesses the sub-pixels of the image sources 812 and 814 in turn. After accessing six sub-pixels, step S920 again accesses the data according to the code arrangement combination until reaching a total of a W number of access times, where W is associated with the width of the output image 820 (or the width of the $V^{th}$ horizontal scan line). The output image 820 is formed by the image data accessed by Step 920, and is directly outputted or first processed and then outputted to a rear-end display device. In the example, a product of pixel count (i.e., 2) corresponding to the number (i.e., 6) of the code arrangement combination multiplied by the total access times W is equal to or smaller than the width of the output image 820. For example, when the width of the output image 820 is 800 pixels, the product of the above pixel count 2 multiplied by W is equal to 800, where W is 400 at this point. That is, step S920 performs 400 times of data access according to the code arrangement combination, with two pixels (or 6 sub-pixels) being accessed each time, and forms the $V^{th}$ horizontal scan line by the accessed data. However, if the product of the pixel count multiplied by W is not exactly equal to the width of the output image 820, the product is then smaller than the width of the output image 820. More specifically, a sum of the product added with a remaining number is equal to the width of the output image 820. After completing the W number of times of access, step S920 sequentially accesses pixels equal to the remaining number (or sub-pixels equal to three times of the remaining number) according to the code arrangement combination to complete the data access of the $V^{th}$ horizontal scan line. After completing the data access according to the code arrangement combination of Set1, step S920 performs subsequent data access according to the code arrangement combination of Set2 to form a $(V+1)^{th}$ horizontal scan line. Similarly, data access of continuous horizontal scan lines having different pixel arrangements and according to all access settings can be completed. Further, to complete the above data access of the horizontal scan lines, step S920 may include steps S922 and S924.

In step S922, when reading the code arrangement combination corresponding to an $X^{th}$ set of access settings among the K sets of access settings (e.g., the access settings Set1 or Set2, where $X^{th}$ is a positive integer not greater than K), counting is performed according to the number of the codes in the code arrangement combination to generate a counting result.

In step S924, the data of the image source represented by each code in the code arrangement combination corresponding to the $X^{th}$ set of access settings is accessed for a W number of times, where details and definition of W are as previously described. More specifically, when the width of the output image 820 is 800 pixels and the number of codes in the code arrangement combination is 6 sub-pixels (which is equal to 2 pixels), assuming the counting result is 6 or a multiple of 6, step S924 repetitively accesses the data of the image source represented by each code in the code arrangement combination corresponding to the $X^{th}$ set of access settings, until the number of counting result as 6 reaches 400 (800 pixels divided by 2 pixels) or when the counting result reaches 6×400=2400. At this point, step S924 has completed the data access for one horizontal scan line. It should be noted that, the width of the output image 820 may be the width of a viewable image or the width of an entire image. One skilled person in the art can appropriately apply the present invention according to the disclosure and application requirements.

The number of horizontal scan lines of an output image is usually greater than the number (i.e., the number K of the access settings) of continuous horizontal scan lines having different pixel arrangements. Therefore, to obtain the data of all the horizontal scan lines of the output image, the embodiment may further include the following steps S930 and S940 (not shown).

In step S930, the K sets of access settings are temporarily stored, so that step S910 need not be repeated. In step S940, step S920 is performed for an H number of times, where H is associated with the height of the output image. More specifically, a product of the number K of the access settings multiplied by a total number of times (H) of performing step S920 is equal to or smaller than the height of the output image. For example, referring to FIG. 8 and Table-1, the number K of the access settings (Set1 and Set2) is equal to 2, and assume that the height of the output image 820 is 600 scan lines. As such, the product of the number (2) of the access settings multiplied by the number of times (H) of performing step S920 is equal to 600, and so H is equal to 300. That is, in step S940, step S920 is performed for 300 times, with the data of two horizontal scan lines being accessed each time, thereby completing the data access of all the horizontal scan lines of the output image 820. However, when the product of the number K of the access settings multiplied by the number of times H for performing step S920 is not exactly equal to the height of the output image 820, the product is smaller than the height of the output image 820. More specifically, a sum of the product added with a remaining number is equal to the height of the output image 820. At this point, in step S940, after performing step S920 for the H number of times, step S920 is further performed for the remaining number of times according a sequence of one or multiple access settings to complete the data access of all of the horizontal scan lines of the output image 820. It should be noted that, the height of the output image 820 may be the height of a viewable image or the height of an entire image.

Further, it should be noted that, given that the K sets of access settings are not temporarily stored, steps S930 and S940 may be replaced by step S950. In step S950, steps S910 and S920 are performed for the H number of times, respectively, where the definition and details of H are as previously described. Details of step S950 can be easily understood by one skilled person in the art with reference to the foregoing description, and shall be omitted herein.

In the above embodiment, the K sets of access settings and the corresponding code arrangement combinations are predetermined by the image access method of the present invention, or may be predetermined by other methods and applied in the embodiment. Further, the number of the codes is equal to the number N of the image sources, the codes are different from one another, and the K sets of code arrangement combinations are also different. Moreover, before outputting the foregoing output image to a rear-end display device, the output image may undergo an appropriate process, e.g., a scaling process. Such is not a focus of the present invention, and shall not be further described in detail.

Figure 10:
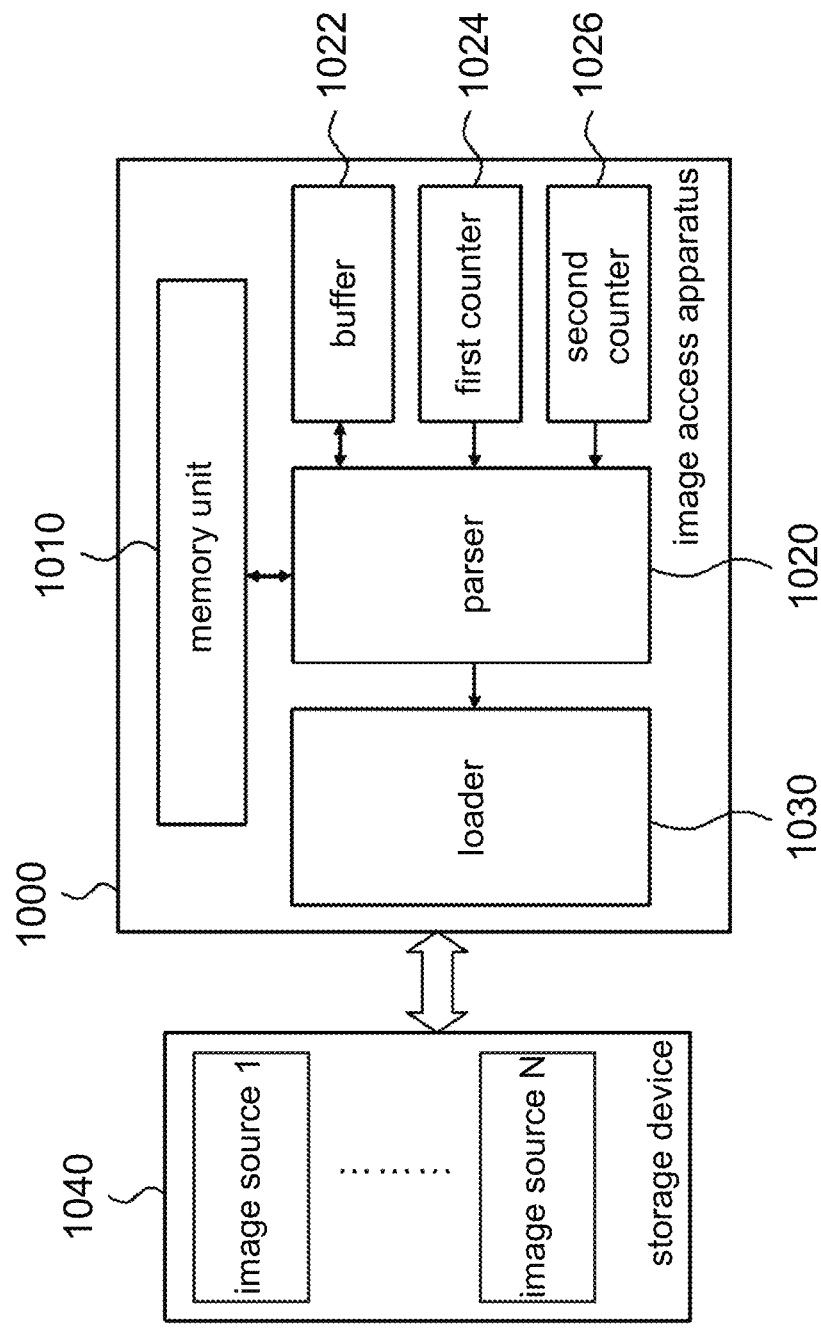
FIG. 10 is a schematic diagram of an image access apparatus according to an embodiment of the present invention.

Based on the above image access method, the present invention further provides an image access apparatus for accessing a part or all of the data of an N number of image sources in a storage device. As shown in FIG. 10, an image access apparatus 1000 according to an embodiment includes a memory unit 1010 (e.g., a non-volatile memory), a parser 1020, and a loader 1030. The memory unit 1010 stores K sets of access settings, each of which corresponds to a code arrangement combination composed of a plurality of codes respectively representing image sources 1 to N in a storage device 1040. Each of the codes includes an M number of A carry bits, where A to the power of M is not smaller than N, and N, K, M and A are all positive integers. The parser 1020 reads the code arrangement combination corresponding to each set of access settings to sequentially output the codes in the code arrangement combination. The loader 1030, coupled to the parser 1020 and the storage device 1040, receives the codes outputted from the parser 1020 and accesses the data of the image source represented by each of the codes from the storage device 1040. Definitions and details of the image sources, access settings, code arrangement combinations and codes are the same as the corresponding disclosure of the foregoing image access method. Without affecting the full disclosure and possible implementation of the present invention, such details are omitted herein.

With reference to the description associated with steps S930 and S940, in order to complete the data access of all horizontal scan lines of an output image, the image access apparatus 1000 according to the embodiment further includes a buffer 1022 (e.g., a flash memory) configured to temporarily store the K sets of access settings, and a first counter 1024 configured to count according to the number K to generate a first counting result. The parser 1020 reads the code arrangement combination corresponding to each set of access settings from the buffer 1022 according to the first counting result, and outputs the code arrangement combination to the loader 1030 for an H number of times. According to the received code, the loader 1030 accesses the data represented by the code from the storage device 1040, so as to complete the data access of all of the horizontal scan lines of the output image. The number H is associated with the height of the output image. With reference to the description of steps S930 and S940, operation details of the first counter 1024, the parser 1020 and the loader 1030, application details of the first counting result, and definitions of the number H and the output image can be easily appreciated by one skilled person in the art. Without affecting the full disclosure and possible implementation of the application, such details are omitted herein. Further, referring to the description of step S950, the image access apparatus 1000 according to the embodiment may include only the first counter 1024 and exclude or not practice the buffer 1022. At this point, the parser 1020 reads the code arrangement combination corresponding to each set of access settings from the memory unit 1010 according to the first counting result, and outputs the code arrangement combination to the loader 1030 for the H number of times, and the loader 1030 accesses the data of the image source represented by each of the codes, thereby completing the data access of all of the horizontal scan lines.

Further, referring to the description of steps S922 and S924, to complete the access for all pixels of one horizontal scan line, the image access apparatus 1000 according to the embodiment may further include a second counter 1026. The second counter 1026, when the parser 1020 reads the code arrangement combination corresponding to an $X^{th}$ set of access settings among the K sets of access settings, counts according to the number of the codes in the code arrangement combination to generate a second counting result. The parser 1020 outputs the code arrangement combination corresponding to the $X^{th}$ set of access settings to the loader 1030 for a W number of times, and the loader 1030 accordingly accesses the data of the image source represented by each of the codes, thereby completing the data access of all of the pixels required by one horizontal scan line. The number W is associated with the width of the output image. Similarly, with reference to the description of steps S922 and S924, operation details of the second counter 1026, the parser 1020 and the loader 1030, application details of the second counting result, and definitions of the number W and the output image can be easily appreciated by one skilled person in the art. Without affecting the full disclosure and possible implementation of the application, such details are omitted herein.

It should be noted that, terms including horizontal, vertical, length and width mentioned in the embodiments are relative descriptions, and other terms corresponding to such relative descriptions are also encompassed within the disclosure of the application.

In conclusion, the image access method and the image access apparatus disclosed by the present invention are capable coordinating with a pixel format arrangement supported by a rear-end display device to appropriately access data from multiple image sources. Therefore, while providing compatibility, the present invention also achieves objects of a simple design, reduced costs and enhanced flexibilities. In other words, regardless of the pixel format arrangement supported by a rear-end display device, the present invention is capable of performing the settings with the same steps to read and parse the access settings according to the same setting rules to appropriately output an image.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image access method, applied to an image access apparatus, comprising:
   a) obtaining K sets of access settings; wherein, K is a positive integer, each set of the K sets of settings corresponds to a code arrangement combination composed of a plurality of codes respectively representing a plurality of image sources; and
   b) accessing, from a storage device and via a loader of the image access apparatus, data of the image sources respectively represented by the codes sequentially according to the K sets of access settings,
   wherein step (b) comprises:
   when accessing the data of the image sources respectively represented by the codes sequentially according to the code arrangement combination corresponding to an $X^{th}$ set of access settings of the K sets of access settings, calculating a number of the codes in the code arrangement combination to generate a counting result, where X is a positive integer not greater than K; and
   obtaining the code arrangement combination corresponding to the $X^{th}$ set of access settings according to the counting result, and accessing the data of the image source represented by the codes for a W number of times, where W is associated with a width of an output image.

2. The method according to claim 1, wherein each set of the K sets of access settings is associated with a pixel format arrangement of a corresponding row in an image.

3. The method according to claim 1, wherein the codes are different.

4. The method according to claim 1, wherein the K sets of code arrangement combinations are different.

5. The method according to claim 1, further comprising:
performing step (a) and step (b) for an H number of times, where H is associated with a height of an output image.

6. The method according to claim 1, further comprising:
temporarily storing the K sets of access settings; and
performing step (b) for an H number of times, where H is associated with a height of an output image, and step (b) further comprises obtaining the temporarily stored K sets of access settings.

7. An image access apparatus, configured to access data of a plurality of image sources, comprising:
a memory unit comprising non-volatile memory, configured to store K sets of access settings, each of which corresponding to a code arrangement combination composed of a plurality of codes respectively representing the image sources, where K is a positive integer; and
a processor that implements:
a parser, configured to read the K sets of access settings from the memory unit to output the K sets of code arrangement combinations corresponding to the K sets of access settings;
a loader, configured to receive the K sets of code arrangement combinations corresponding to the K sets of access settings, and to sequentially access data of the image sources respectively represented by the codes; and
a first counter, configured to count according to the value K to generate a first counting result;
wherein, the first counting result corresponds to a value H, H is associated with a height of an output image and is a positive integer, and the parser obtains the K sets of access settings from the memory unit to output the K sets of code arrangement combinations corresponding to the K sets of access settings for the H number of times.

8. The apparatus according to claim 7, wherein each set of the K sets of access settings is associated with a pixel format arrangement of a corresponding row in an image.

9. The apparatus according to claim 7, wherein the codes are different.

10. The apparatus according to claim 7, wherein the K sets of code arrangement combinations are different.

11. The apparatus according to claim 7, wherein the processor further implements:
a second counter, configured to, when the parser obtains the code arrangement combination corresponding to an $X^{th}$ set of access settings of the K sets of access settings, calculate a number of the codes in the code arrangement combination corresponding to the $X^{th}$ set of access settings to generate a second counting result, where X is a positive integer not greater than K;
wherein, the second counting result corresponds to a value W, the value W is associated with a width of an output image and is a positive integer, and the parser outputs the code arrangement combination corresponding to the $X^{th}$ set of access settings for the W number of times.

12. An image access apparatus, configured to access data of a plurality of image sources, comprising:
a memory unit comprising non-volatile memory, configured to store K sets of access settings, each of which corresponding to a code arrangement combination composed of a plurality of codes respectively representing the image sources, where K is a positive integer; and
a processor that implements:
a parser, configured to read the K sets of access settings from the memory unit to output the K sets of code arrangement combinations corresponding to the K sets of access settings;
a loader, configured to receive the K sets of code arrangement combinations corresponding to the K sets of access settings, and to sequentially access data of the image sources respectively represented by the codes;
a buffer, configured to temporarily store the K sets of access settings; and
a first counter, configured to count according to the value K to generate a first counting result;
wherein, the first counting result corresponds to a value H, H is associated with a height of an output image and is a positive integer, and the parser obtains the K sets of access settings from the buffer to output the K sets of code arrangement combinations corresponding to the K sets of access settings for the H number of times.

* * * * *